United States Patent
Himoto et al.

(10) Patent No.: US 9,334,786 B2
(45) Date of Patent: May 10, 2016

(54) EXHAUST TREATMENT UNIT

(71) Applicant: KOMATSU LTD., Tokyo (JP)

(72) Inventors: Manabu Himoto, Kyotanabe (JP);
Osamu Nishimura, Joyo (JP); Tatsuya Watahiki, Oyama (JP); Hiroyuki Chino, Oyama (JP)

(73) Assignee: KOMATSU LTD., Tokyo (JP)

( * ) Notice: Subject to any disclaimer, the term of this patent is extended or adjusted under 35 U.S.C. 154(b) by 162 days.

(21) Appl. No.: 14/343,569

(22) PCT Filed: Nov. 19, 2012

(86) PCT No.: PCT/JP2012/079923
§ 371 (c)(1),
(2) Date: Mar. 7, 2014

(87) PCT Pub. No.: WO2014/061165
PCT Pub. Date: Apr. 24, 2014

(65) Prior Publication Data
US 2015/0345360 A1 Dec. 3, 2015

(30) Foreign Application Priority Data
Oct. 16, 2012 (JP) ................................. 2012-228779

(51) Int. Cl.
*F01N 3/00* (2006.01)
*F01N 13/08* (2010.01)
(Continued)

(52) U.S. Cl.
CPC ................ *F01N 13/08* (2013.01); *B60K 13/04* (2013.01); *E02F 9/0866* (2013.01); *F01N 3/021* (2013.01); *F01N 3/2066* (2013.01); *F01N 3/28* (2013.01); *F01N 13/1811* (2013.01)

(58) Field of Classification Search
CPC ..... B60K 13/04; F01N 13/1811; F01N 13/08; F01N 13/14; F01N 13/1816; F01N 13/10
USPC .................. 60/295, 297, 299, 301, 311, 322; 180/296, 309
See application file for complete search history.

(56) References Cited

U.S. PATENT DOCUMENTS 5,988,308 A 11/1999 Qutub
6,260,652 B1 * 7/2001 Steenackers ........... B60K 13/04
180/296

(Continued)

FOREIGN PATENT DOCUMENTS

JP 2006-70712 A 3/2006
JP 2006070712 A * 3/2006
(Continued)

OTHER PUBLICATIONS

The International Search Report for the corresponding international application No. PCT/JP2012/079923, issued on Nov. 19, 2012.

Primary Examiner — Patrick Maines
(74) Attorney, Agent, or Firm — Global IP Counselors, LLP

(57) ABSTRACT

An exhaust treatment unit treats an exhaust gas from an engine of a work vehicle. The exhaust treatment unit includes a diesel particulate filter device, a selective catalytic reduction device, and a connection pipe. The diesel particulate filter device treats the exhaust gas. The selective catalytic reduction device treats the exhaust gas. The connection pipe connects the diesel particulate filter device and the selective catalytic reduction device. The connection pipe includes a plurality of spherical joints, a first pipe part on a first end, and a second pipe part on a second end. The plurality of spherical joints include a first spherical joint mounted between the first pipe part and the diesel particulate filter device, a second spherical joint mounted between the second pipe part and the selective catalytic reduction device, and a third spherical joint mounted between the first and second pipe parts.

5 Claims, 11 Drawing Sheets

(51) Int. Cl.
*F01N 3/021* (2006.01)
*F01N 3/20* (2006.01)
*B60K 13/04* (2006.01)
*F01N 3/28* (2006.01)
*E02F 9/08* (2006.01)
*F01N 13/18* (2010.01)

(56) References Cited

U.S. PATENT DOCUMENTS

| | | | |
|---|---|---|---|
| 2011/0074150 A1 | 3/2011 | Drost et al. | |
| 2011/0113760 A1* | 5/2011 | Trinkner | F01N 13/1822 60/297 |
| 2011/0126529 A1* | 6/2011 | Park | F01N 3/2066 60/303 |
| 2011/0252788 A1* | 10/2011 | Kleinfeld | F02B 37/16 60/602 |
| 2012/0247861 A1* | 10/2012 | Mizuno | B60K 13/04 180/296 |
| 2014/0262590 A1* | 9/2014 | Daborn | F01N 3/035 180/309 |
| 2014/0348716 A1* | 11/2014 | Park | F01N 3/2066 422/171 |

FOREIGN PATENT DOCUMENTS

| | | |
|---|---|---|
| JP | 2011-196264 A | 10/2011 |
| JP | 2012-97413 A | 5/2012 |
| WO | 2009/012819 A1 | 1/2009 |
| WO | 2011152306 A1 | 12/2011 |

* cited by examiner

EXHAUST TREATMENT UNIT

CROSS-REFERENCE TO RELATED APPLICATIONS

This application is a U.S. National stage application of International Application No. PCT/JP2012/079923, filed on Nov. 19, 2012. This U.S. National stage application claims priority under 35 U.S.C. §119(a) to Japanese Patent Application No. 2012-228779, filed in Japan on Oct. 16, 2012, the entire contents of which are hereby incorporated herein by reference.

BACKGROUND

1. Field of the Invention

The present invention relates to an exhaust treatment unit for treating exhaust gas from an engine of a work vehicle.

2. Background Information

Work vehicles such as a hydraulic excavator are equipped with an exhaust treatment device. The exhaust treatment device is connected to an engine through a connection pipe (note the connection pipe connected to the engine is hereinafter referred to as a first connection pipe) in order to treat the exhaust gas from the engine. As described in Japan Laid-open Patent Application Publication No. JP-2012-097413(A), for instance, the exhaust treatment device includes a diesel particulate filter device and a selective catalytic reduction device (SRC catalytic converter).

The diesel particulate filter device is connected to the first connection pipe and performs treatment of reducing particulates contained in the exhaust gas from the engine. The exhaust gas after the treatment is transferred to the selective catalytic reduction device through a connection pipe (note the connection pipe connecting the diesel particulate filter device and the selective catalytic reduction device is hereinafter referred to as a second connection pipe). The selective catalytic reduction device reduces nitrogen oxide (NO$_x$) contained in the exhaust gas treated by the diesel particulate filter device. In some cases, these two exhaust treatment devices and the second connection pipe are installed in a work vehicle as a single unit for implementing easiness of maintenance. Such unit is referred to as an exhaust treatment unit.

SUMMARY

The two exhaust treatment devices are both heavy objects. Therefore, when the exhaust treatment unit is attached to a support member, the relative position and/or the relative posture between the diesel particulate filter device and the selective catalytic reduction device may not be kept constant. When the relative position and/or the relative posture between the diesel particulate filter device and the selective catalytic reduction device cannot be thus kept constant, it becomes difficult to connect the diesel particulate filter device and the selective catalytic reduction device with use of the second connection pipe in attaching the respective devices.

It is an object of the present invention to provide a technology of enabling the diesel particulate filter device and the selective catalytic reduction device to be connected through the second connection pipe even when relative positional displacement and/or relative postural displacement are/is produced between the diesel particulate filter device and the selective catalytic reduction device.

An exhaust treatment unit according to a first aspect of the present invention is an exhaust treatment unit for treating an exhaust gas from an engine of a work vehicle, and includes a diesel particulate filter device, a selective catalytic reduction device and a connection pipe. The diesel particulate filter device and the selective catalytic reduction device are configured to treat the exhaust gas. The connection pipe connects the diesel particulate filter device and the selective catalytic reduction device. The connection pipe includes a plurality of spherical joints. The connection pipe has a first pipe part on one end thereof and has a second pipe part on the other end thereof. The plural spherical joints include a first spherical joint, a second spherical joint and a third spherical joint. The first spherical joint is mounted between the first pipe part and the diesel particulate filter device. The second spherical joint is mounted between the second pipe part and the selective catalytic reduction device. The third spherical joint is mounted between the first pipe part and the second pipe part.

An exhaust treatment unit according to a second aspect of the present invention relates to the exhaust treatment unit according to the first aspect, and wherein a center axis of the first spherical joint and a center axis of the second spherical joint are respectively arranged perpendicularly to a center axis of the third spherical joint.

An exhaust treatment unit according to a third aspect of the present invention relates to the exhaust treatment unit according to the first or second aspect, and wherein the diesel particulate filter device and the selective catalytic reduction device are disposed in alignment with each other such that longitudinal directions thereof are the same. The connection pipe is disposed adjacently to the diesel particulate filter device and the selective catalytic reduction device such that a longitudinal direction thereof is the same as the longitudinal direction of the diesel particulate filter device and the longitudinal direction of the selective catalytic reduction device. The connection pipe is connected to the diesel particulate filter device on the one end thereof and is connected to the selective catalytic reduction device on the other end thereof.

An exhaust treatment unit according to a fourth aspect of the present invention relates to the exhaust treatment unit according to any one of the first to third aspects, and further includes a first support component and a second support component. The first support component supports the diesel particulate filter device. The second support component supports the selective catalytic reduction device and the first support component. The first support component and the second support component are separately provided components.

An exhaust treatment unit according to a fifth aspect of the present invention relates to the exhaust treatment unit according to the fourth aspect, and wherein the second support component is shaped by means of stamping.

In the exhaust treatment unit according to the first aspect of the present invention, the connection pipe includes the plural spherical joints. Therefore, the diesel particulate filter device and the selective catalytic reduction device are reliably connected no matter how the relative position and the relative posture between the diesel particulate filter device and the selective catalytic reduction device vary within a predetermined range. Further, the spherical joints are respectively mounted between the connection pipe and the diesel particulate filter device and between the connection pipe and the selective catalytic reduction device. Therefore, the relative position between the diesel particulate filter device and the selective catalytic reduction device can widely vary within the aforementioned predetermined range.

In the exhaust treatment unit according to the second aspect of the present invention, the respective center axes of the first and second spherical joints are arranged perpendicularly to the center axis of the third spherical joint. Therefore, the position and the posture of the connection pipe can be flexibly changed relatively to the diesel particulate filter device and the selective catalytic reduction device. In other words, the diesel particulate filter device and the selective catalytic reduction device can be reliably connected through the connection pipe.

In the exhaust treatment unit according to the third aspect of the present invention, the diesel particulate filter device, the selective catalytic reduction device and the connection pipe are disposed adjacently to each other such that the longitudinal directions thereof can be the same. Therefore, the exhaust treatment unit can be compactly structured.

In the exhaust treatment unit according to the fourth aspect of the present invention, the support component for supporting the diesel particulate filter device and the support component for supporting the selective catalytic reduction device are different from each other. Therefore, there are chances that the relative position and/or the relative posture between the diesel particulate filter device and the selective catalytic reduction device vary/varies to a large extent. However, the diesel particulate filter device and the selective catalytic reduction device are reliably connected through the plural spherical joints.

In the exhaust treatment unit according to the fifth aspect of the present invention, the second support component for supporting the selective catalytic reduction device is shaped by means of stamping. There are chances that the relative position and/or the relative posture between the diesel particulate filter device and the selective catalytic reduction device vary/varies to a large extent due to deformation of the second support component. However, the diesel particulate filter device and the selective catalytic reduction device are reliably connected through the plural spherical joints.

DETAILED DESCRIPTION OF EMBODIMENT(S)

Figure 1:
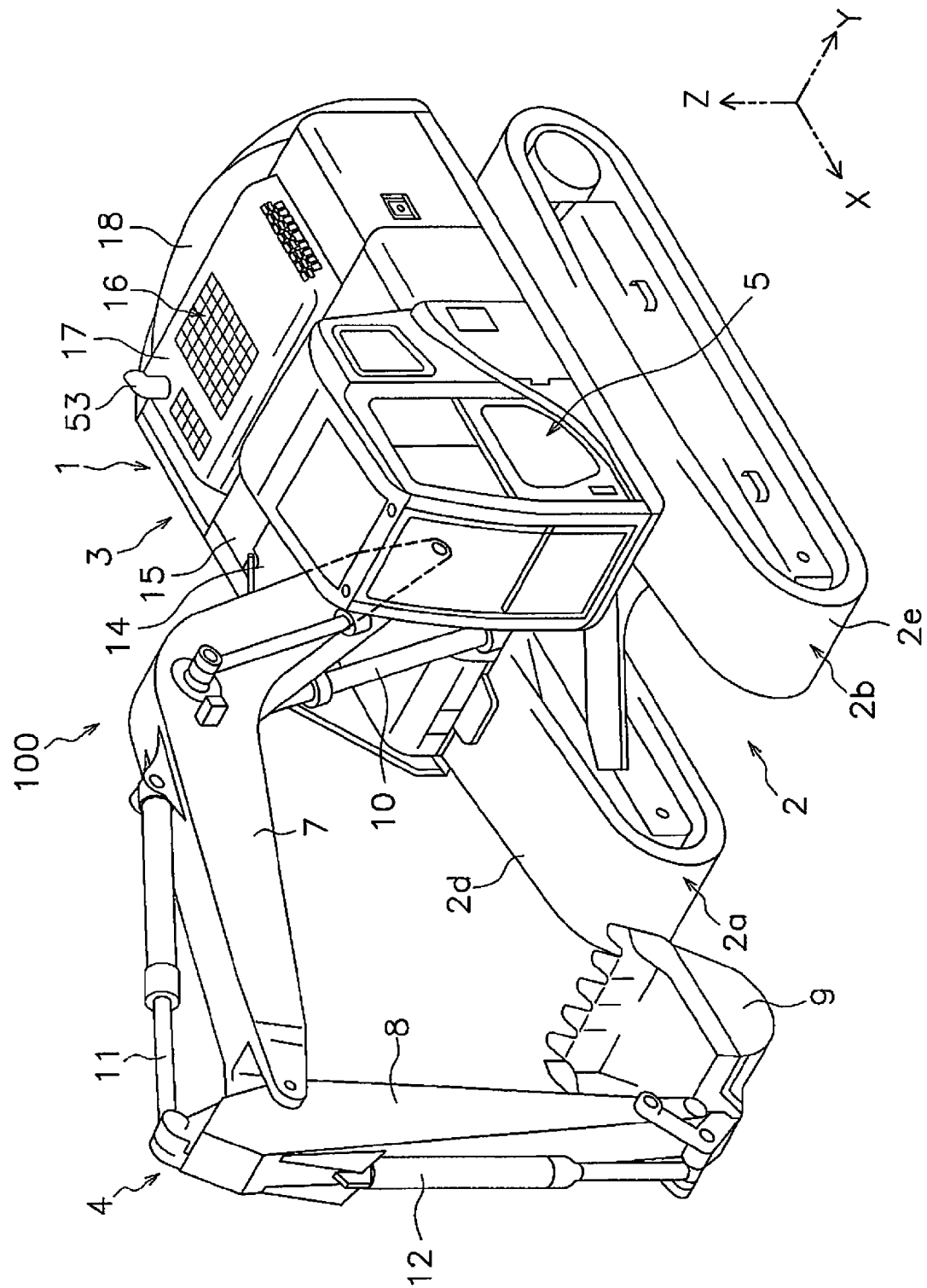
FIG. 1 is a perspective view of a work vehicle according to an exemplary embodiment of the present invention.

FIG. 1 illustrates a work vehicle 100 according to a first exemplary embodiment of the present invention. In the present exemplary embodiment, explanation will be made by exemplifying a hydraulic excavator as the work vehicle. The work vehicle 100 includes a vehicle main body 1 and a working implement 4.

The vehicle main body 1 includes a travelling unit 2 and a revolving unit 3. The travelling unit 2 includes a pair of drive units 2a and 2b. The drive units 2a and 2b respectively include crawler belts 2d and 2e. The drive units 2a and 2b are configured to drive the crawler belts 2d and 2e by means of driving force from an engine 21 to be described (see FIG. 2) for causing the work vehicle 100 to run. It should be noted that in the following explanation, the term "back-and-forth direction" refers to the back-and-forth direction of the vehicle main body 1. In other words, the term "back-and-forth direction" refers to the back-and-forth direction seen from an operator seated in a cab 5. Further, the term "right-and-left direction" or "lateral direction" refers to the vehicle width direction of the vehicle main body 1. In other words, the right-and-left direction, the vehicle width direction or the lateral direction is the right-and-left direction seen from the aforementioned operator. Further, in the drawings, the back-and-forth direction, the right-and-left direction and an up-and-down direction are represented with an x-axis, a y-axis and a z-axis, respectively.

The revolving unit 3 is mounted on the travelling unit 2. The revolving unit 3 is configured to be able to revolve with respect to the travelling unit 2. Further, the revolving unit 3 is provided with the cab 5. The revolving unit 3 includes a fuel tank 14, a hydraulic oil tank 15, an engine compartment 16 and a counterweight 18. The fuel tank 14 stores fuel for driving the engine 21 to be described hereinafter. The fuel tank 14 is disposed in front of the hydraulic oil tank 15. The hydraulic oil tank 15 stores hydraulic oil to be discharged from a hydraulic pump 23 to be described hereinafter (see FIG. 2). The hydraulic oil tank 15 is disposed in alignment with the fuel tank 14 in the back-and-forth direction.

The engine compartment 16 accommodates a variety of devices including the engine 21 and the hydraulic pump 23 as described below. The engine compartment 16 is disposed behind the cab 5, the fuel tank 14 and the hydraulic oil tank 15. The top side of the engine compartment 16 is covered with an engine hood 17. The counterweight 18 is disposed behind the engine compartment 16.

The working implement 4 is attached to the center position on the front part of the revolving unit 3. The working implement 4 includes a boom 7, an arm 8, a bucket 9, a boom cylinder 10, an arm cylinder 11 and a bucket cylinder 12. The base end of the boom 7 is rotatably coupled to the revolving unit 3. On the other hand, the tip end of the boom 7 is rotatably coupled to the base end of the arm 8. The tip end of the arm 8 is rotatably coupled to the bucket 9. The boom cylinder 10, the arm cylinder 11 and the bucket cylinder 12 are hydraulic cylinders configured to be driven by the hydraulic oil discharged from the hydraulic pump 23 to be described hereinafter. The boom cylinder 10 is configured to actuate the boom 7. The arm cylinder 11 is configured to actuate the arm 8. The bucket cylinder 12 is configured to actuate the bucket 9. The working implement 4 is configured to be driven by the driving of the cylinders 10, 11 and 12.

Figure 2:
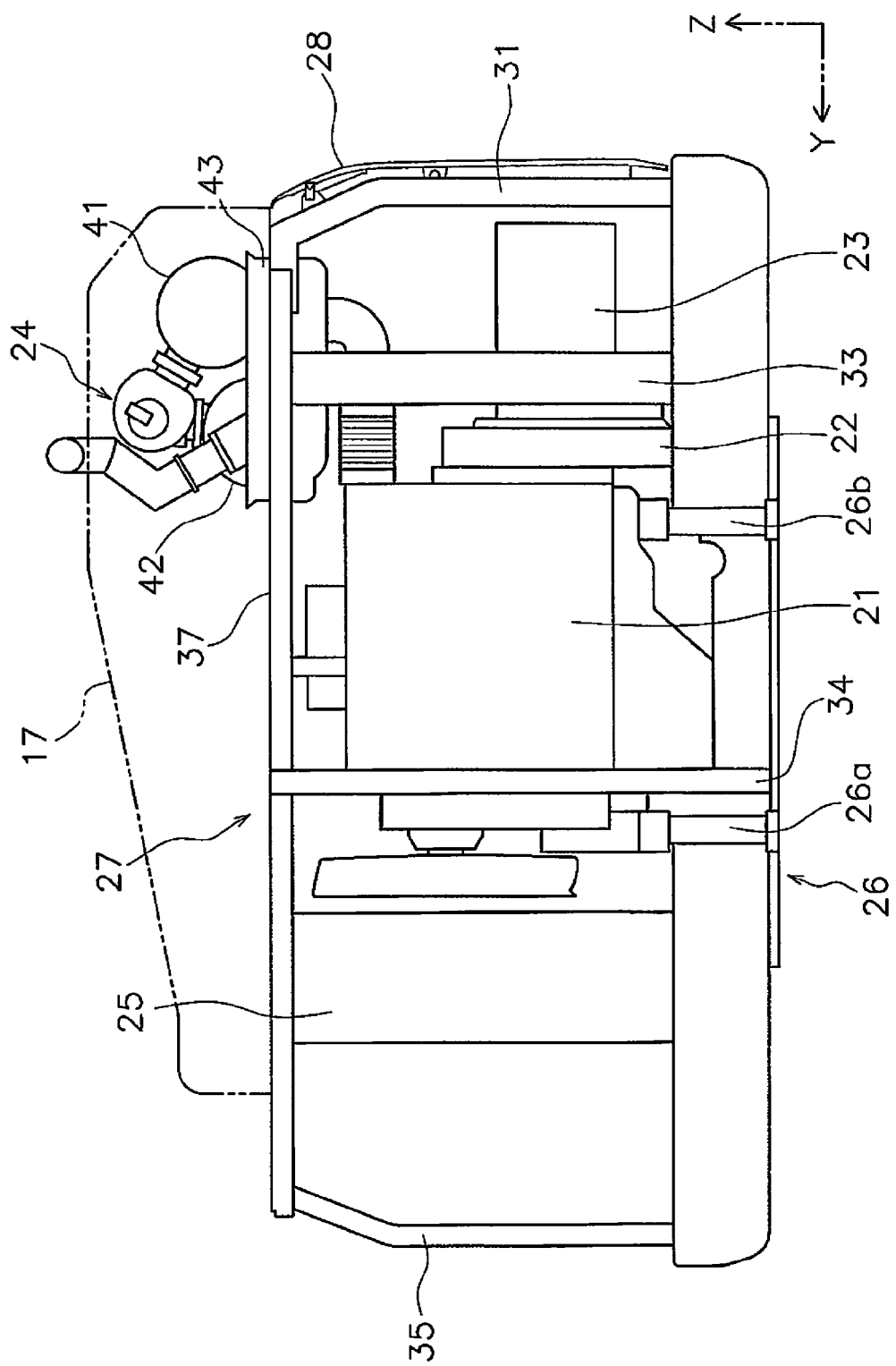
FIG. 2 is a diagram of an internal structure of an engine compartment seen from rear.
Figure 3:
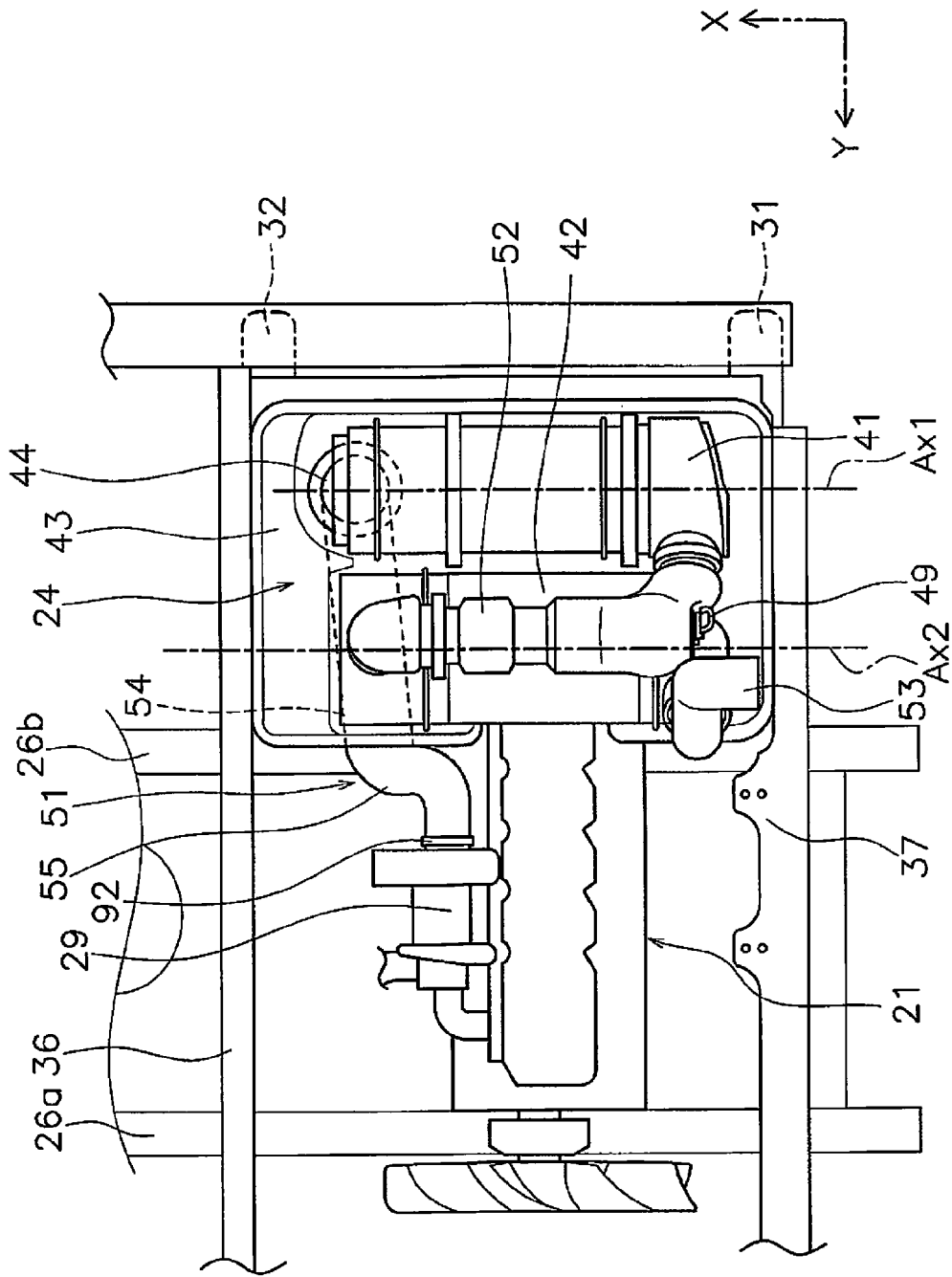
FIG. 3 is a diagram of the internal structure of the engine compartment seen from above.

FIG. 2 is a diagram of the internal structure of the engine compartment 16 seen from rear. FIG. 3 is a diagram of the internal structure of the engine compartment 16 seen from above. As illustrated in FIG. 2, the engine 21, a flywheel housing 22, the hydraulic pump 23 and an exhaust treatment unit 24 are disposed in the engine compartment 16. Further, a cooling device 25, including a radiator and an oil cooler, is disposed in the engine compartment 16. The cooling device 25, the engine 21, the flywheel housing 22 and the hydraulic pump 23 are disposed in alignment with each other in the vehicle width direction.

As illustrated in FIG. 2, the work vehicle 100 includes a revolving frame 26 and a vehicle body frame 27. The revolving frame 26 includes a pair of center frames 26a and 26b extending in the back-and-forth direction. The revolving frame 26 supports the engine 21 through rubber dampers.

The vehicle body frame 27 is disposed upright on the revolving frame 26. The vehicle body frame 27 is disposed in the surrounding of a variety of devices such as the engine 21 and the hydraulic pump 23. An exterior cover 28 is attached to the vehicle body frame 27. It should be noted that FIG. 2 illustrates only a part of the exterior cover 28. The engine hood 17 illustrated in FIG. 1 is also attached to the vehicle body frame 27.

As illustrated in FIGS. 2 and 3, the vehicle body frame 27 includes a plurality of column members 31 to 35 and a plurality of beam members 36 and 37. The column members 31 to 35 are disposed to extend upwardly from the revolving frame 26. The beam members 36 and 37 are supported by the column members 31 to 35. Specifically, as illustrated in FIG. 3, the plural beam members 36 and 37 include the first beam member 36 and the second beam member 37. The first beam member 36 and the second beam member 37 are disposed away from each other in the back-and-forth direction. The first beam member 36 is disposed in front of the engine 21. The second beam member 37 is disposed behind the engine 21.

The hydraulic pump 23 is configured to be driven by the engine 21. As illustrated in FIG. 2, the hydraulic pump 23 is disposed laterally to the engine 21. In other words, the hydraulic pump 23 is disposed in alignment with the engine 21 in the vehicle width direction. The hydraulic pump 23 is disposed at a position lower than the top surface of the engine 21.

The flywheel housing 22 is disposed between the engine 21 and the hydraulic pump 23. The flywheel housing 22 is attached to a lateral surface of the engine 21. On the other hand, the hydraulic pump 23 is attached to a lateral surface of the flywheel housing 22.

Figure 4:
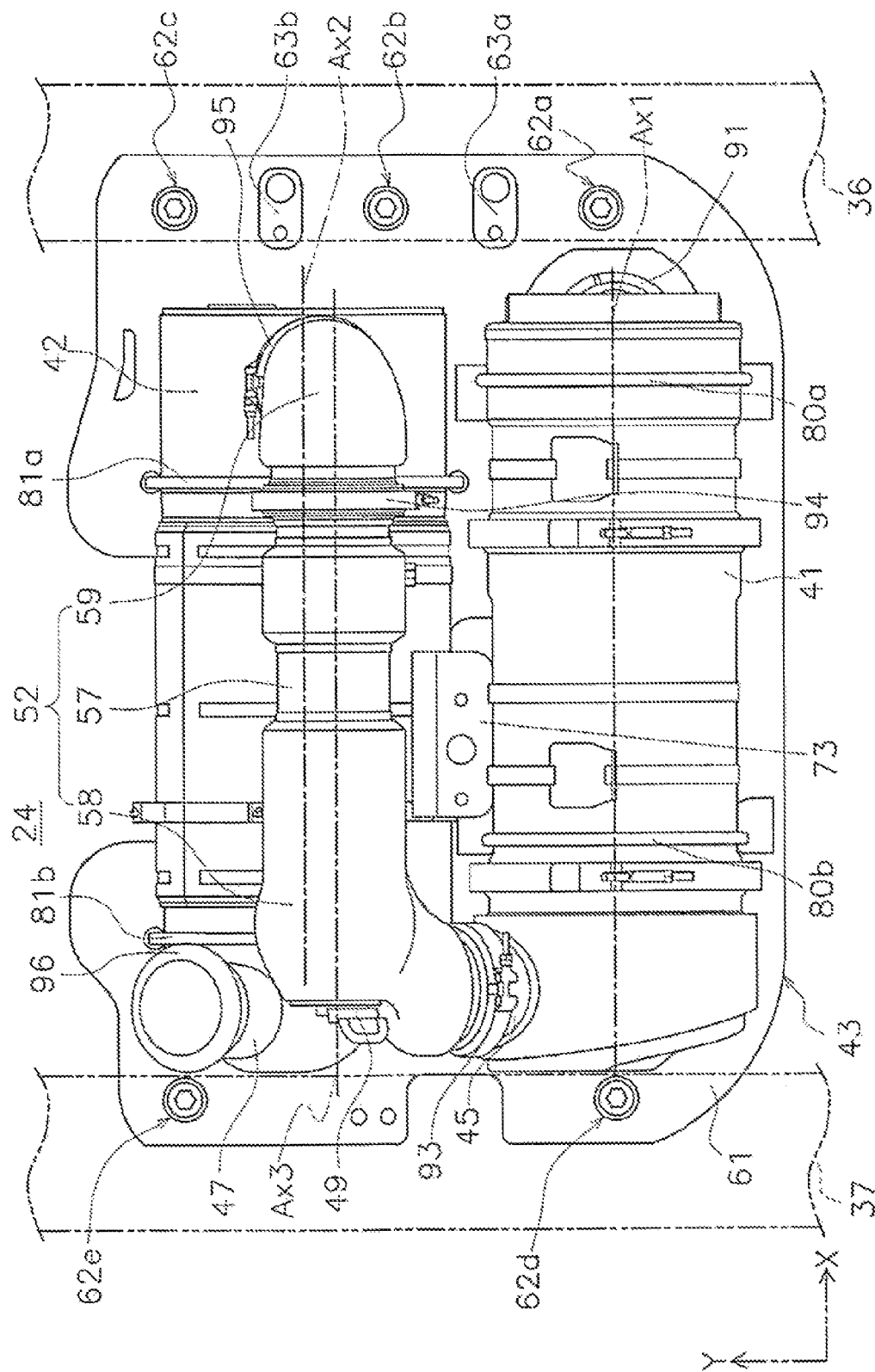
FIG. 4 is a plan view of an exhaust treatment unit.

As illustrated in FIG. 2, the exhaust treatment unit 24 is disposed above the hydraulic pump 23. FIG. 4 is an enlarged view of a part related to the exhaust treatment unit 24 in FIG. 3. In other words, FIG. 4 is a plan view of the exhaust treatment unit 24. In FIG. 4, some components, which are connected to but not included in the exhaust treatment unit 24, are depicted with two-dot chain lines. As illustrated in FIGS. 3 and 4, the exhaust treatment unit 24 includes a diesel particulate filter device 41, a selective catalytic reduction device 42 (example of a selective reduction catalyst), a bracket 43 and a second connection pipe 52. As illustrated in FIGS. 3 and 4, the exhaust treatment unit 24 is bridged between the first beam member 36 and the second beam member 37. The exhaust treatment unit 24 is supported by the beam members 36 and 37. In other words, the diesel particulate filter device 41 and the selective catalytic reduction device 42 are supported by the vehicle body frame 27. As illustrated in FIGS. 2 to 4, the diesel particulate filter device 41 and the selective catalytic reduction device 42 are disposed in alignment with each other in the vehicle width direction.

The diesel particulate filter device 41 is configured to treat the exhaust gas from the engine 21. The diesel particulate filter device 41 is configured to collect particulates contained in the exhaust gas by a filter. The diesel particulate filter device 41 is configured to burn the collected particulates by a heater attached to the filter.

The diesel particulate filter device 41 has a roughly cylindrical contour. As illustrated in FIG. 3, the diesel particulate filter device 41 is disposed such that its center axis Ax1 is arranged along the back-and-forth direction. Therefore, the diesel particulate filter device 41 is disposed such that its center axis Ax1 is arranged perpendicularly to the direction that the engine 21 and the hydraulic pump 23 are aligned (the direction is hereinafter referred to as a first direction). In other words, the diesel particulate filter device 41 is disposed while its longitudinal direction is arranged perpendicularly to the first direction.

The selective catalytic reduction device 42 is configured to treat the exhaust gas from the engine 21. The selective catalytic reduction device 42 is configured to selectively reduce nitrogen oxide $NO_x$ by urea hydrolysis. The selective catalytic reduction device 42 has a roughly cylindrical contour. The selective catalytic reduction device 42 is disposed such that its center axis Ax2 is arranged along the back-and-forth direction. Therefore, the selective catalytic reduction device 42 is disposed such that its center axis Ax2 is arranged perpendicularly to the first direction. In other words, the selective catalytic reduction device 42 is disposed such that its longitudinal direction is arranged perpendicularly to the first direction. Further, the selective catalytic reduction device 42 is disposed such that its center axis Ax2 is arranged in parallel to the center axis Ax1 of the diesel particulate filter device 41. In other words, the diesel particulate filter device 41 and the selective catalytic reduction device 42 are disposed in alignment with each other such that the longitudinal directions thereof are the same.

Figure 5:
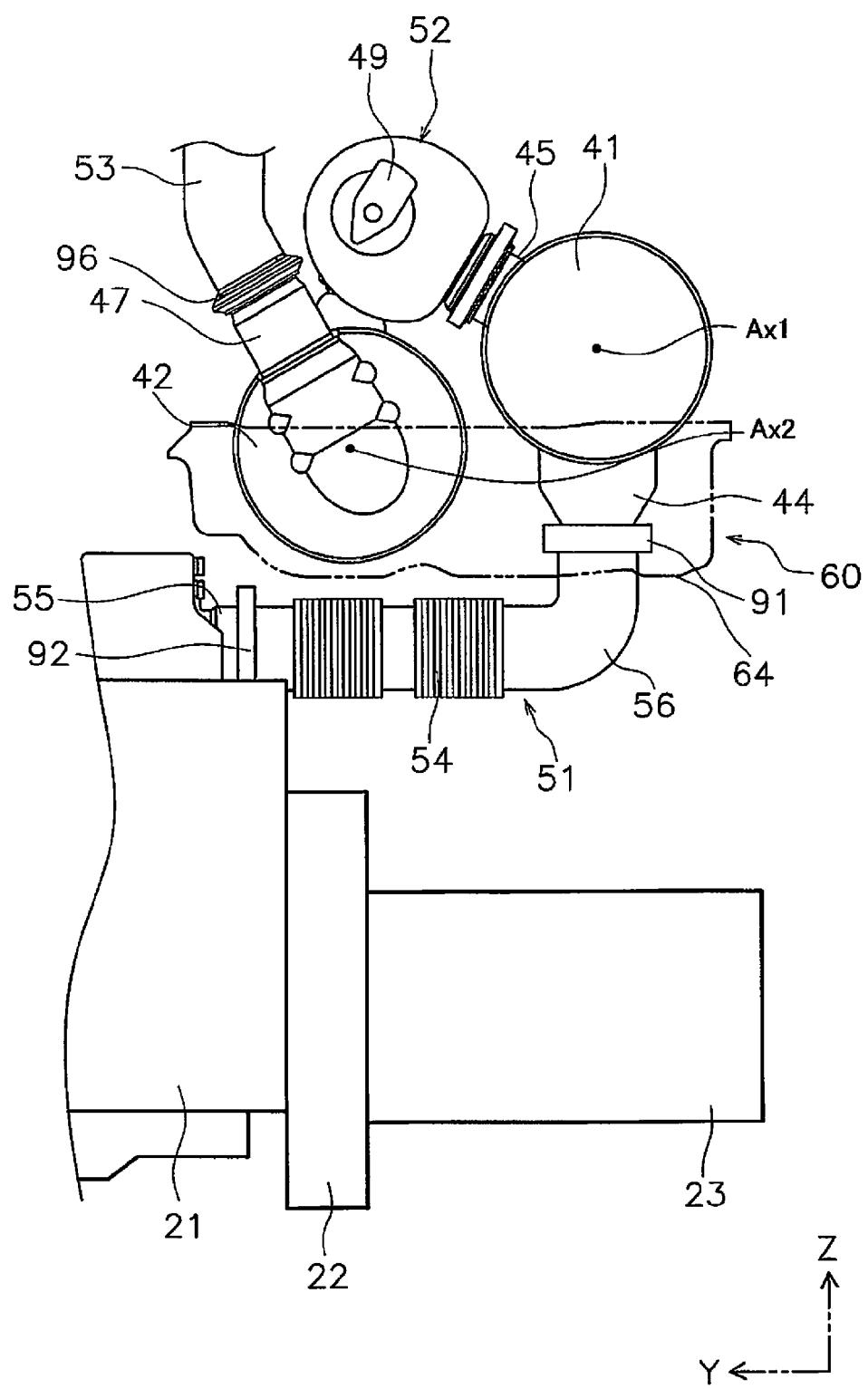
FIG. 5 is an enlarged view of the exhaust treatment unit and its vicinity of FIG. 2.
Figure 6:
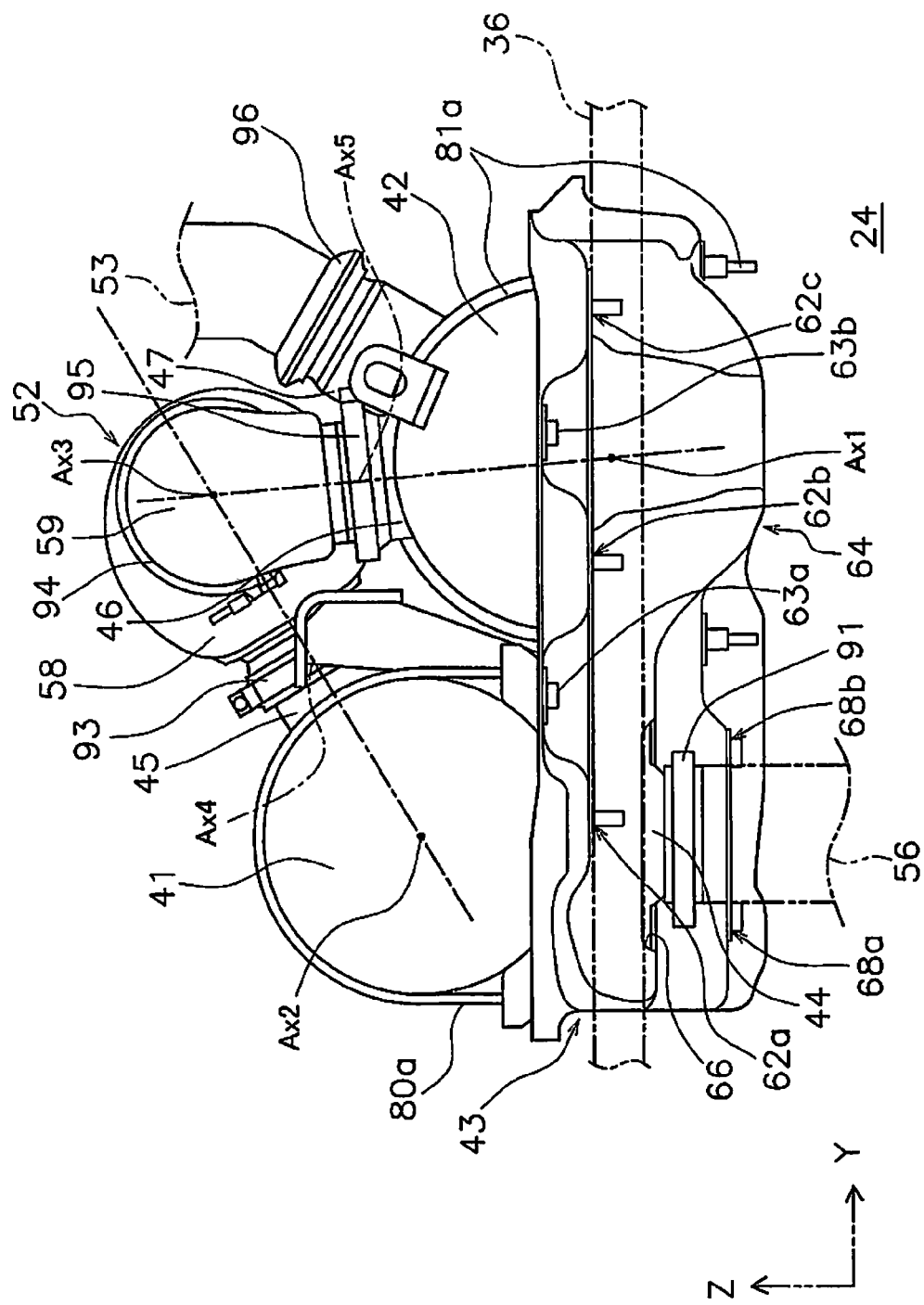
FIG. 6 is a diagram of the exhaust treatment unit seen from front.
Figure 7:
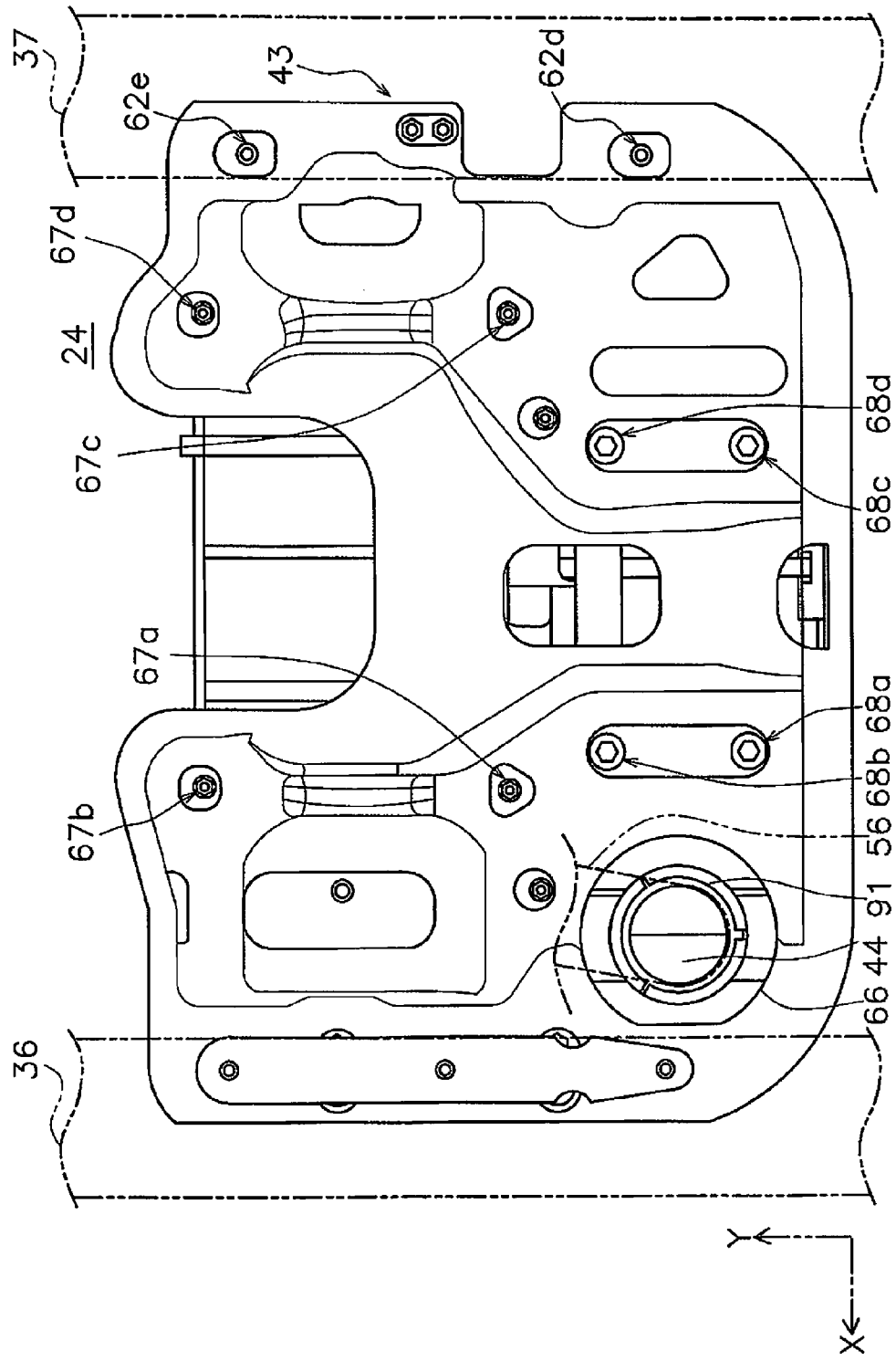
FIG. 7 is a bottom view of the exhaust treatment unit.

FIG. 5 is an enlarged view of the exhaust treatment unit 24 and its vicinity in FIG. 2. It should be noted that in FIG. 5, for easy understanding, the contour of a second support component 60 to be described hereinafter is depicted with a two-dot chain line without illustration of some components such as the vehicle body frame 27. FIG. 6 is a diagram of the exhaust treatment unit 24 in FIG. 5 seen from front. FIG. 7 is a bottom view of the exhaust treatment unit 24. In FIGS. 6 and 7, some components, which are connected to but not included in the exhaust treatment unit 24, are displayed with two-dot chain lines.

As illustrated in FIG. 5, the diesel particulate filter device 41 and the selective catalytic reduction device 42 are disposed above the hydraulic pump 23. The bottom part of the selective catalytic reduction device 42 is positioned below the top surface of the engine 21. As illustrated in FIGS. 5 to 7, the diesel particulate filter device 41 includes a first connection port 44.

As illustrated in FIG. 5, the work vehicle 100 includes a first connection pipe 51. The first connection pipe 51 couples the engine 21 and the diesel particulate filter device 41. The first connection pipe 51 has a bellows part 54 that can be extended and contracted. For example, the bellows part 54 is formed by coupling a plurality of bellows-type expansion and contraction joints. The bellows part 54 is horizontally disposed. Specifically, the bellows part 54 extends in the vehicle width direction. The bellows part 54 is disposed above the hydraulic pump 23. The bellows part 54 is partially positioned under the selective catalytic reduction device 42. In other words, the first connection pipe 51 passes under the selective catalytic reduction device 42.

The first connection pipe 51 includes a first curved portion 55, a second curved portion 56 and spherical joints 91 and 92. As illustrated in FIG. 3, the first curved portion 55 couples the bellows part 54 and the engine 21. In other words, one end of the first connection pipe 51 is connected to an exhaust port of the engine 21 via a supercharger 29. As illustrated in FIG. 5, the first curved portion 55 is connected to the bellows part 54 by the spherical joint 92. In other words, the spherical joint 92 is provided between the first curved portion 55 and the bellows part 54. As illustrated in FIG. 5, the second curved portion 56 couples the bellows part 54 and the first connection port 44. In other words, the other end of the first connection pipe 51 is connected to the first connection port 44 of the diesel particulate filter device 41. As illustrated in FIGS. 5 to 7, the second curved portion 56 is connected to the first connection port 44 by the spherical joint 91. In other words, the spherical joint 91 is provided between the second curved portion 56 and the first connection port 44. It should be noted that a publicly known technology disclosed in US2011/0074150A1, for instance, may be utilized as the spherical joints 91 and 92.

As illustrated in FIGS. 5 to 7, the first connection port 44 is disposed on the lowermost part of the diesel particulate filter device 41. Therefore, the connection part between the first connection pipe 51 and the diesel particulate filter device 41 is positioned right below the diesel particulate filter device 41.

As illustrated in FIGS. 4 and 6, the diesel particulate filter device 41 has a second connection port 45. The second connection port 45 is positioned closer to the selective catalytic reduction device 42 than the center axis Ax1 of the diesel particulate filter device 41 is. Further, the second connection port 45 is positioned higher than the center axis Ax1 of the diesel particulate filter device 41. The second connection port 45 is obliquely protruded in the upward direction and in the vehicle width direction. The selective catalytic reduction device 42 has a third connection port 46. As illustrated in FIG. 6, the third connection port 46 is positioned on the uppermost part of the selective catalytic reduction device 42.

As illustrated in FIGS. 4 and 6, one end (example of "first end") of the second connection pipe 52 is connected to the second connection port 45 of the diesel particulate filter device 41. The other end (example of "second end") of the second connection pipe 52 is connected to the third connection port 46 of the selective catalytic reduction device 42. In other words, the second connection pipe 52 connects the diesel particulate filter device 41 and the selective catalytic reduction device 42. The second connection pipe 52 is disposed adjacently to the selective catalytic reduction device 42 while being disposed over the selective catalytic reduction device 42.

As illustrated in FIG. 4, the second connection pipe 52 includes a straight portion 57, a third curved portion 58 and a fourth curved portion 59. The straight portion 57 is positioned over the selective catalytic reduction device 42. The straight portion 57 extends along a center axis Ax3 that is parallel to the center axis Ax1 of the diesel particulate filter device 41 and the center axis Ax2 of the selective catalytic reduction device 42. In other words, the second connection pipe 52 is disposed such that its longitudinal direction is the same as the longitudinal direction of the diesel particulate filter device 41 and that of the selective catalytic reduction device 42. The third curved portion 58 couples the straight portion 57 and the second connection port 45. The third curved portion 58 is connected to the second connection port 45 through a spherical joint 93. In other words, the spherical joint 93 is mounted between the third curved portion 58 and the second connection port 45. An aqueous urea injection device 49 is attached to the third curved portion 58. The aqueous urea injection device 49 is configured to inject aqueous urea into the second connection pipe 52. The fourth curved portion 59 couples the straight portion 57 and the third connection port 46. The fourth curved portion 59 is connected to the straight portion 57 through a spherical joint 94. In other words, the spherical joint 94 is mounted between the fourth curved portion 59 and the straight portion 57. The fourth curved portion 59 is connected to the third connection port 46 through a spherical joint 95. In other words, the spherical joint 95 is mounted between the fourth curved portion 59 and the third connection port 46. In the present exemplary embodiment, the straight portion 57 and the third curved portion 58 are collectively referred to as a first pipe part. Further, the fourth curved portion 59 is referred to also as a second pipe part. In other words, the second connection pipe 52 includes the first pipe part on one end side thereof and has the second pipe part on the other end side thereof. The spherical joint 93 (example of a "first spherical joint") is mounted between the first pipe part and the diesel particulate filter device 41. The spherical joint 95 (example of a "second spherical joint") is mounted between the second pipe part and the selective catalytic reduction device 42. The spherical joint 94 (example of a "third spherical joint") is mounted between the first pipe part and the second pipe part. It should be noted that the publicly known technology disclosed in US2011/0074150A1, for instance, may be utilized as the spherical joints 93 to 95.

It should be noted that as illustrated in FIG. 6, the center axis Ax4 of the spherical joint 93 forms an acute angle together with the y-axis. As illustrated in FIG. 4, the center axis Ax3 of the spherical joint 94 is coincident with the center axis Ax3 of the straight portion 57 of the second connection pipe 52 and arranged roughly parallel to the x-axis. As illustrated in FIG. 6, the center axis Ax5 of the spherical joint 95 is arranged roughly parallel to the z-axis. In other words, such a relation is established that the center axes of the spherical joints 93 and 95 are roughly perpendicular to the spherical joint 94. In other words, even in response to variation in relative posture due to respective rotations about the x-axis, the y-axis and the z-axis and variation in relative position in the respective directions of the x-axis, the y-axis and the z-axis, the position and the posture of the second connection pipe 52 can be flexibly changed with respect to the second connection port 45 and the third connection port 46. In other words, the diesel particulate filter device 41 and the selective catalytic reduction device 42 can be reliably connected through the second connection pipe 52.

As illustrated in FIGS. 5 and 6, the selective catalytic reduction device 42 includes a fourth connection port 47. The fourth connection port 47 protrudes obliquely upwards. Specifically, the fourth connection port 47 protrudes obliquely upwards and towards the engine 21. The aforementioned aqueous urea injection device 49 is positioned over the fourth connection port 47. However, the fourth connection port 47 is obliquely disposed to avoid interfering with the aqueous urea injection device 49. The work vehicle 100 is provided with an exhaust pipe 53. The exhaust pipe 53 is connected to the fourth connection port 47. Specifically, the exhaust pipe 53 is connected to the fourth connection port 47 by a spherical joint 96. In other words, the spherical joint 96 is mounted between the exhaust pipe 53 and the fourth connection port 47. The publicly known technology disclosed in US2011/0074150A1, for instance, may be utilized as the spherical joint 96. The upper part of the exhaust pipe 53 protrudes upwardly from the engine hood 17.

The engine 21, the first connection pipe 51, the diesel particulate filter device 41, the second connection pipe 52, the selective catalytic reduction device 42 and the exhaust pipe 53 are connected in series in this sequential order. Therefore, the exhaust gas from the engine 21 is transferred to the diesel particulate filter device 41 via the first connection pipe 51. In the diesel particulate filter device 41, particulates are mostly reduced from the exhaust gas. Next, the exhaust gas is transferred to the selective catalytic reduction device 42 via the second connection pipe 52. In the selective catalytic reduction device 42, $NO_x$ is mostly reduced. Subsequently, the cleaned exhaust gas is discharged to the outside via the exhaust pipe 53.

Figure 8:
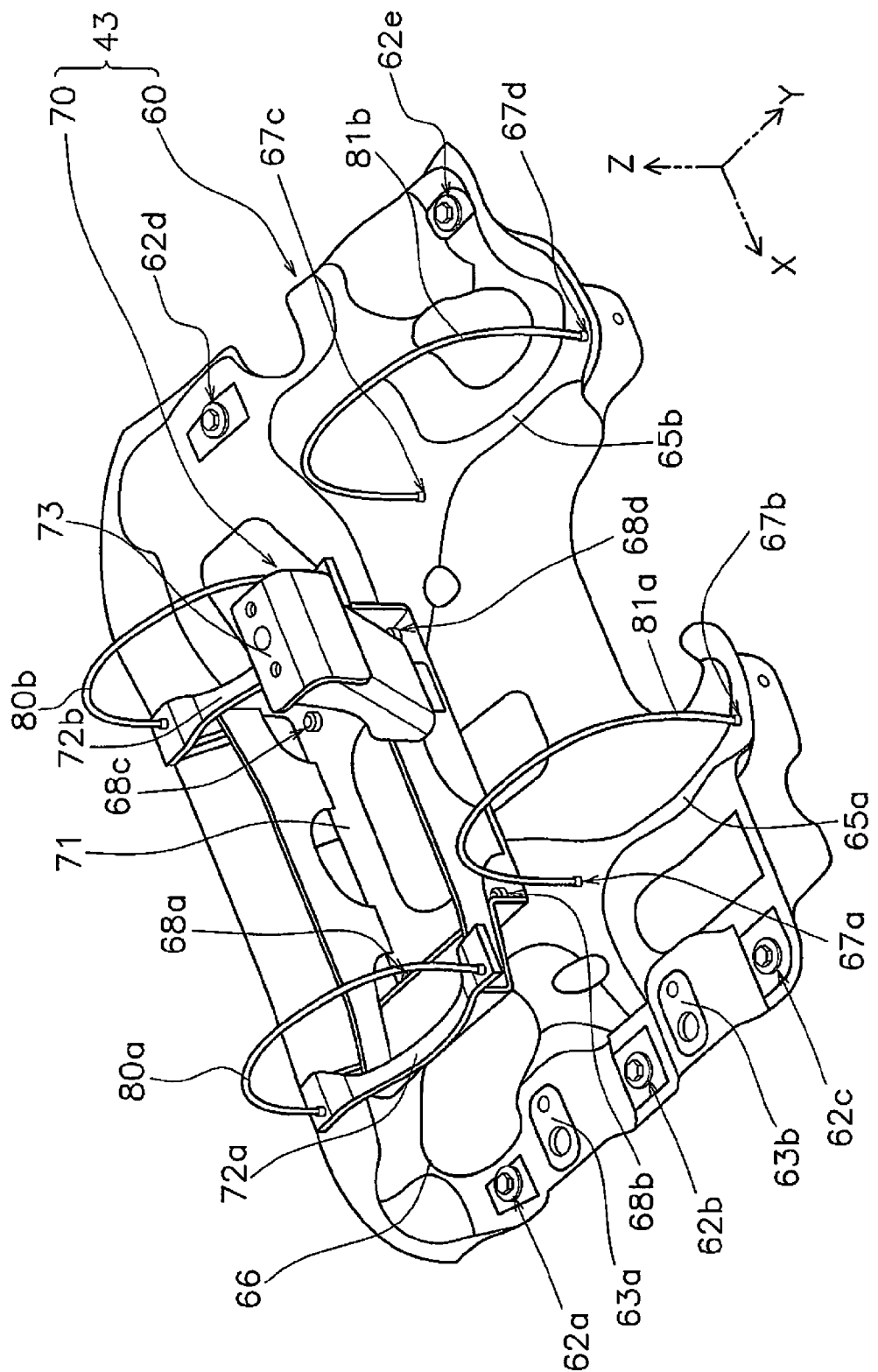
FIG. 8 is a perspective view of fixing components for the exhaust treatment device.

The diesel particulate filter device 41 and the selective catalytic reduction device 42 are attached to the bracket 43. FIG. 8 is a perspective view of fixing components for fixing the diesel particulate filter device 41 and the selective catalytic reduction device 42. As illustrated in FIG. 8, the fixing components include the bracket 43, first locking components 80a and 80b and second locking components 81a and 81b. The bracket 43 includes a first support component 70 (example of a "first support") and the second support component 60 (example of a "second support"). The first support component 70 includes a bottom portion 71, first support portions 72a and 72b and a first attachment portion 73. The second support component 60 includes second attachment portions 62a, 62b, 62c, 62d and 62e, third attachment portions 63a and 63b, second support portions 65a and 65b, an insertion hole 66, fourth attachment portions 67a, 67b, 67c and 67d, and fifth attachment portions 68a, 68b, 68c and 68d The first support component 70 is a component provided separately from the second support component 60, and is attached to the second support component 60. The bottom portion 71 contacts a part of the second support component 60 (particularly, peripheral portions of the fifth attachment portions 68a to 68d). The bottom portion 71 is perforated to form holes corresponding to the fifth attachment portions 68a to 68d to be described hereinafter.

The first support portions 72a and 72b are positioned above the bottom portion 71. The first support portions 72a and 72b support the diesel particulate filter device 41. In other words, the first support component 70 supports the diesel particulate filter device 41. The diesel particulate filter device 41 has a roughly cylindrical contour, while the first support portions 72a and 72b include contact surfaces fitted to the outer peripheral surface of the diesel particulate filter device 41. More specifically, the first support portions 72a and 72b include contact surfaces formed in a convex shape bulged downwards.

The first locking components 80a and 80b are attached around the diesel particulate filter device 41 supported by first support portions 72a and 72b (to be described in detail hereinafter) of the first support component 70. The diesel particulate filter device 41 is fixed on the first support component 70 by the first locking components 80a and 80b and the first support portions 72a and 72b.

The first attachment portion 73 is utilized together with the third attachment portions 63a and 63b in order to attach/detach the exhaust treatment unit 24 to/from the vehicle. Detailed explanation will be made below for the first attachment portion 73.

The second support component 60 is shaped by means of stamping of a single member. The second support component 60 has a downwardly recessed shape.

The second attachment portions 62a to 62e are attached to the vehicle body frame 27 of the work vehicle 100. In more detail, as illustrated in FIGS. 4 and 7, the second attachment portions 62a, 62b and 62c are attached to the first beam member 36, whereas the second attachment portions 62d and 62e are attached to the second beam member 37. The second attachment portions 62a to 62e are positioned on the same plane. As illustrated in FIGS. 4, 6 and 7, in the present exemplary embodiment, the second support component 60 is attached to the beam members 36 and 37 with use of bolts and so forth. Accordingly, the second attachment portions 62a to 62e include holes. However, when another fixing means such as a latch is employed, the second attachment portions 62a to 62e may be formed in another shape or may include such members as hooks.

The bracket 43 is fixed to the vehicle body frame 27 by the second attachment portions 62a to 62e. In other words, the exhaust treatment unit 24 is fixed to the vehicle body frame 27. The second attachment portions 62a to 62e are detachably attached to the beam members 36 and 37. In other words, the exhaust treatment unit 24 is detachably attached to the vehicle body frame 27.

The second support portions 65a and 65b support the selective catalytic reduction device 42. Accordingly, the second support component 60 supports the selective catalytic reduction device 42. The selective catalytic reduction device 42 has a roughly cylindrical contour, while the second support portions 65a and 65b include contact surfaces fitted to the outer peripheral surface of the selective catalytic reduction device 42. More specifically, the second support portions 65a and 65b have contact surfaces formed in a downwardly recessed shape.

The second locking components 81a and 81b are attached around the selective catalytic reduction device 42 supported by second support portions 65a and 65b. The selective catalytic reduction device 42 is fixed on the second support component 60 by the second locking components 81a and 81b and the second support portions 65a and 65b.

The fourth attachment portions 67a to 67d include holes through which the second locking components 81a and 81b for locking the selective catalytic reduction device 42 are inserted. Each of the second locking components 81a and 81b includes screw grooves on the both ends thereof. As illustrated in FIGS. 6 to 8, the second locking components 81a and 81b are fixed, by means of nuts, to the fourth attachment portions 67a to 67d on the bottom surface of the second support component 60, i.e., on the opposite side of where the selective catalytic reduction device 42 is supported.

The third attachment portions 63a and 63b are utilized together with the first attachment portion 73 in order to attach/detach the exhaust treatment unit 24 to/from the vehicle. Specifically, the attachment/detachment work for the exhaust treatment unit 24 is performed by hoisting the exhaust treatment unit 24 with use of hooks as hoisting tools attached to the third attachment portions 63a and 63b and the first attachment portion 73. Further, while the hooks as hoisting tools are not attached to the third attachment portions 63a and 63b and/or the first attachment portion 73, another member may be attached to the work vehicle 100. For example, an example of such member is a cover for covering at least a part of the exhaust treatment unit. As illustrated in FIG. 6, the third attachment portions 63a and 63b are positioned above the second attachment portions 62a, 62b and 62c for facilitating attachment/detachment of the hooks of hoisting tools.

The fifth attachment portions 68a to 68d include holes through which bolts for fixing the first support component 70 to the second support component 60 are inserted. As illustrated in FIGS. 6 to 8, the first support component 70 and the second support component 60 are fixed to each other with use of bolts and nuts. In other words, the first support component 70 is detachably attached to the second support component 60. Further, the second support component 60 supports the first support component 70 by the fifth attachment portions 68a to 68d.

As illustrated in FIGS. 6 and 7, the first connection port 44 is inserted through the insertion hole 66. As illustrated in FIG. 6, the lowermost part of the first connection port 44 is positioned above the bottom surface of the second support component 60. Accordingly, the first connection port 44 does not contact the ground even when the exhaust treatment unit 24 is detached from the work vehicle 100 and is placed on the ground. Further, although not illustrated in the drawings, the lowermost part of the first connection port 44 is positioned above the bottom portion 71. Accordingly, the first connection port 44 does not contact the ground even when the first support component 70 supporting the diesel particulate filter device 41 is detached from the second support component 60 and is placed on the ground. With the aforementioned structure, the maintenance performance of the diesel particulate filter device 41 can be further enhanced.

The exhaust treatment unit 24 according to the present exemplary embodiment has the following features. The second connection pipe 52 includes the three spherical joints 93, 94 and 95. Accordingly, the diesel particulate filter device 41 and the selective catalytic reduction device 42 can be reliably connected through the second connection pipe 52, no matter how the relative position and/or the relative posture between the diesel particulate filter device 41 and the selective catalytic reduction device 42 vary/varies within a predetermined range. The reasons for the above are hereinafter explained in detail with reference to the drawings.

In view of the structure of the bracket 43 illustrated in FIG. 8, the following three factors can be assumed as the factors of the relative positional displacement and/or the relative postural displacement between the diesel particulate filter device 41 and the selective catalytic reduction device 42. The first factor is: (1) an error in attachment between the diesel particulate filter device 41 and the selective catalytic reduction device 42. The next factor is: (2) vibration-related loosening of the first locking components 80a and 80b and the second locking components 81a and 81b. The last factor is: (3) deformation of the bracket 43, especially, deformation of the second support component 60. The factors (1) and (2) cause either postural displacement due to rotation about the x-axis or positional displacement in the x-axial direction. The factor (3) causes either postural displacements due to rotation about the y-axis and rotation about the z-axis or positional displacements in the respective x-axial, y-axial and z-axial directions. The magnitudes of displacements attributed to the factors (1) and (2) seem to be greater than the magnitude of displacement attributed to the factor (3). Therefore, explanation is herein made for the reason that three spherical joints are required for the positional displacement in the x-axial direction. Similarly, positional displacements in the other axial directions or postural displacements due to rotations may be considered.

Figure 9:
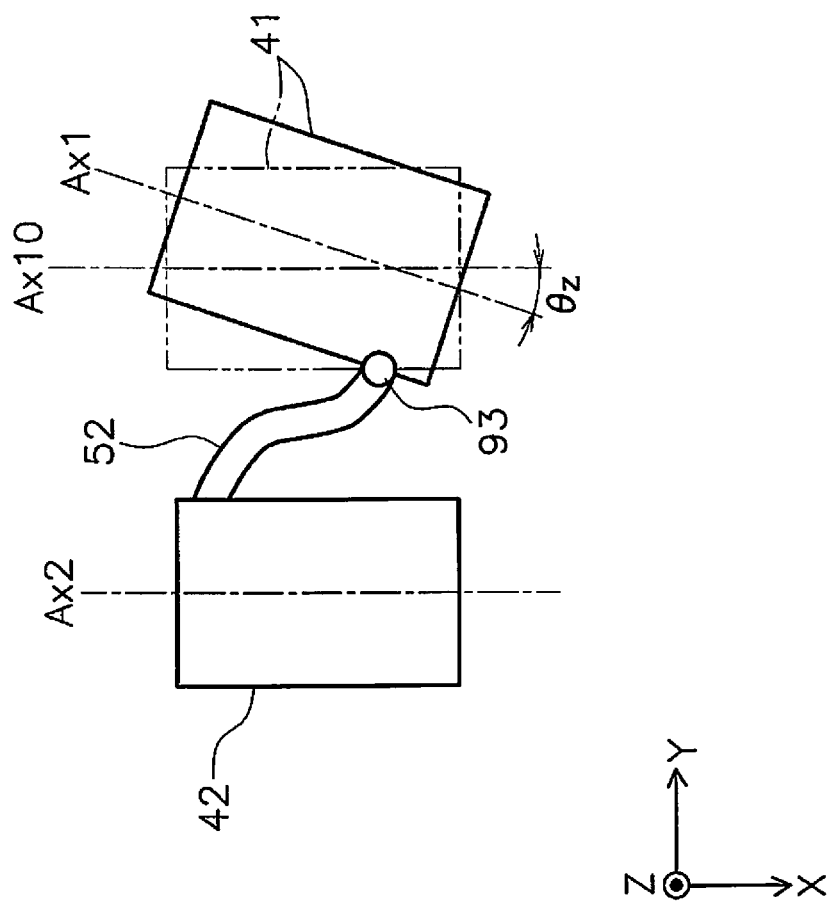
FIG. 9 is an explanatory diagram for illustrating variation in the relative position and the relative posture of a diesel particulate filter device with respect to a selective catalytic reduction device where a second connection pipe includes only a single spherical joint.

FIG. 9 illustrates variation in the relative position of the diesel particulate filter device 41 and variation in the relative posture of the diesel particulate filter device 41 with respect to the selective catalytic reduction device 42, where the second connection pipe 52 includes only a single spherical joint. It should be noted that for convenience of explanation, FIG. 9 illustrates variation in the relative position of the diesel particulate filter device 41 and variation in the relative posture of the diesel particulate filter device 41 with respect to the selective catalytic reduction device 42, in case that the single spherical joint is the spherical joint 93. Explanation is made below for such a case that the single spherical joint is other than the spherical joint 93.

As a representative example, FIG. 9 illustrates variation in the posture of the diesel particulate filter device 41, where the diesel particulate filter device 41 is rotated about the z-axis with respect to the selective catalytic reduction device 42. In FIG. 9, the appropriate position of the diesel particulate filter device 41 is depicted with a two-dot chain line, while the displaced position and posture of the diesel particulate filter device 41 are depicted with a solid line where the diesel particulate filter device 41 is attached to the spherical joint 93. It should be noted that a center axis Ax10 represents the center axis where the diesel particulate filter device 41 is disposed in the appropriate position.

As is obvious with reference to FIG. 9, when only the spherical joint 93 is used, it is possible to cope with variations in the posture of the diesel particulate filter device 41 about the x-axis, the y-axis and z-axis. However, when positional displacement is caused in the x-axial direction (direction that the center axes Ax10 and Ax2 are directed), the second connection pipe 52 cannot couple the diesel particulate filter device 41 and the selective catalytic reduction device 42 by the single spherical joint 93. This situation is unchanged, no matter which direction the center axis of the spherical joint is directed. In other words, there are chances that, when the second connection pipe 52 has only the single spherical joint, the second connection pipe 52 cannot connect the diesel particulate filter device 41 and the selective catalytic reduction device 42, no matter which direction the center axis of the spherical joint included in the second connection pipe 52 is directed to.

Figure 10:
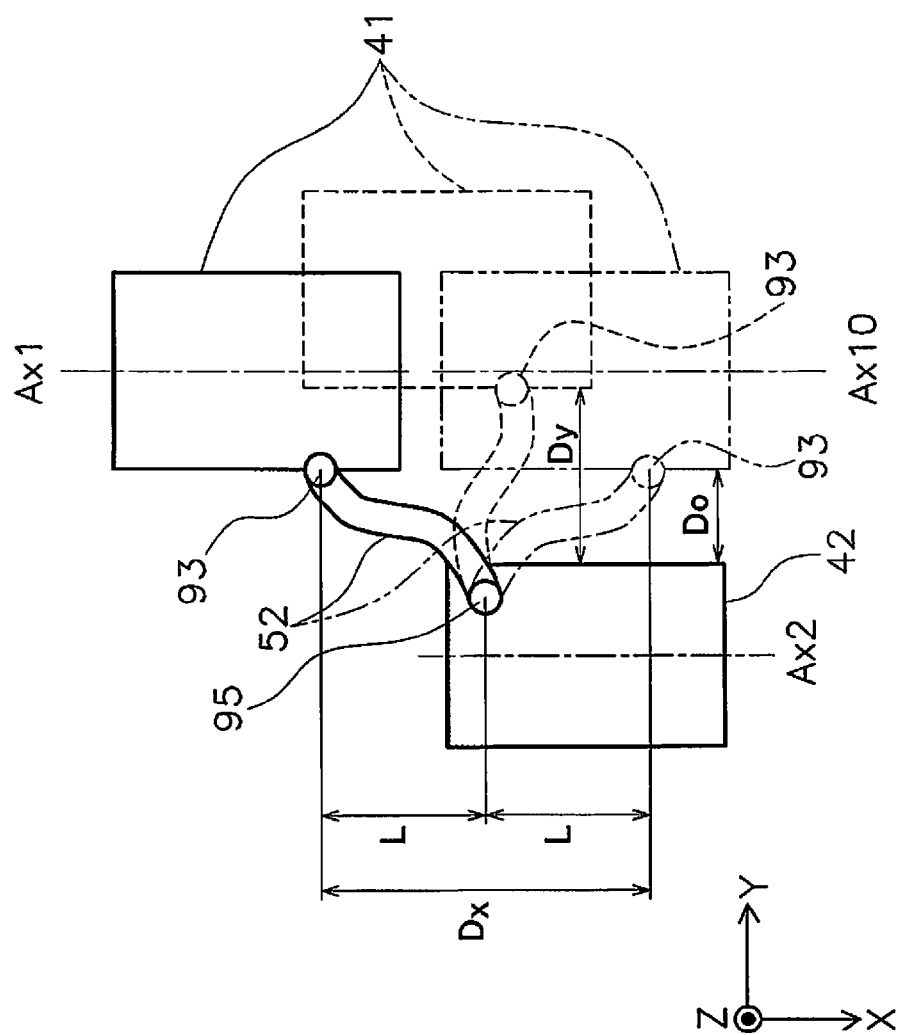
FIG. 10 is an explanatory diagram for illustrating variation in the relative position of the diesel particulate filter device with respect to the selective catalytic reduction device where the second connection pipe includes two spherical joints.

FIG. 10 illustrates variation in the relative position of the diesel particulate filter device 41 with respect to the selective catalytic reduction device 42, where the second connection pipe 52 includes two spherical joints. FIG. 10 illustrates variation in the relative position of the diesel particulate filter device 41 with respect to the selective catalytic reduction device 42, where the two spherical joints are the spherical joints 93 and 95. Explanation is made below for such a case that the two spherical joints are other than the spherical joints 93 and 95.

FIG. 10 illustrates variation in the position of the diesel particulate filter device 41 where the diesel particulate filter device 41 is rotated at the spherical joint 95 about the z-axis with respect to the selective catalytic reduction device 42. As illustrated in FIG. 6, the center axis of the spherical joint 95 is only slightly slanted from the z-axis. Therefore, explanation is herein made where the center axis of the spherical joint 95 is set to be the z-axis. The diesel particulate filter device 41 is rotated at the spherical joint 93 about the z-axis without changing the posture of the diesel particulate filter device 41. It should be noted that similarly in FIG. 10, the center axis of the spherical joint 93 is set to be the y-axis. Further, the meaning of the center axis Ax10 and the illustration depicted with a two-dot chain line are the same as those in FIG. 9.

In FIG. 10, it is assumed that rotation at the spherical joint 93 about the x-axis is not performed at all. With the assumption, where the diesel particulate filter device 41 is assumed to be moved in the x-axial direction without changing a distance Do between the diesel particulate filter device 41 and the selective catalytic reduction device 42, two values of 0 and 2L (where L is the x-axial length of the second connection pipe 52), represented in FIG. 10, will be obtained as a relative positional change amount Dx in the x-axial direction.

Therefore, there are chances that, when the second connection pipe 52 includes only the two spherical joints, the second connection pipe 52 cannot connect the diesel particulate filter device 41 and the selective catalytic reduction device 42, no matter which directions the center axes of the two spherical joints included in the second connection pipe 52 are directed to.

Figure 11:
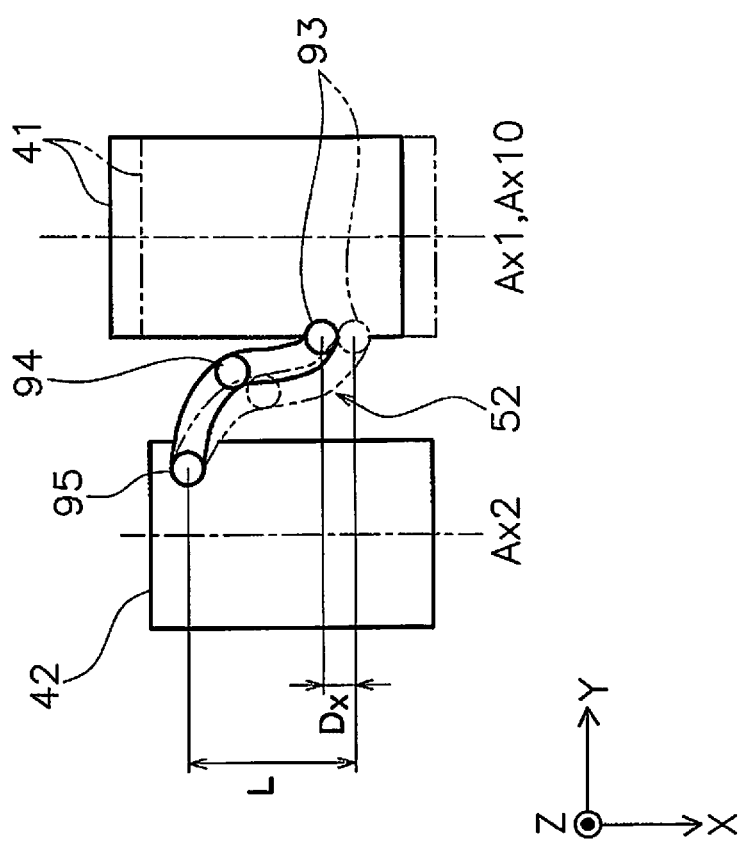
FIG. 11 is an explanatory diagram for illustrating variation in the relative position of the diesel particulate filter device with respect to the selective catalytic reduction device where the second connection pipe includes three spherical joints.

FIG. 11 illustrates variation in the relative position of the diesel particulate filter device 41 with respect to the selective catalytic reduction device 42, where the second connection pipe 52 includes three spherical joints. FIG. 11 illustrates variation in the relative position of the diesel particulate filter device 41 with respect to the selective catalytic reduction device 42, where the three spherical joints are the spherical joints 93, 94 and 95. Explanation is made below for such a case that the three spherical joints are other than the spherical joints 93 to 95.

As illustrated in FIG. 11, the diesel particulate filter device 41 can be transferred in the x-axial direction with respect to the selective catalytic reduction device 42 by rotating the spherical joints 93, 94 and 95 about the x-axial, y-axial and z-axial directions little by little. It should be noted that the relative positional variation Dx in the x-axial direction is limited to be in a range of roughly 0 to 2L (where L is the x-axial length of the second connection pipe 52). However, the range is enough to cope with the relative positional displacement in the x-axial direction due to the aforementioned factors (1) to (3). In other words, even when the relative positional displacement in the x-axial direction is caused due to the factors (1) to (3), the second connection pipe 52 can connect the diesel particulate filter device 41 and the selective catalytic reduction device 42. Based on the above, with the structure that the second connection pipe 52 includes the three spherical joints 93, 94 and 95, the diesel particulate filter device 41 and the selective catalytic reduction device 42 can be reliably connected by the second connection pipe 52, no matter how the relative position and/or the relative posture between the diesel particulate filter device 41 and the selective catalytic reduction device 42 vary/varies within a predetermined range.

It should be noted that, even where the three spherical joints are mounted in positions other than those of the respective spherical joints 93, 94 and 95 in the present exemplary embodiment, the diesel particulate filter device 41 and the selective catalytic reduction device 42 can be connected by the second connection pipe 52 when the relative positional displacement in the x-axial direction is caused due to the factors (1) to (3). However, the present exemplary embodiment has the feature that the spherical joints 93 and 95 are mounted between the second connection pipe 52 and the diesel particulate filter device 41 and between the second connection pipe 52 and the selective catalytic reduction device 42. Therefore, the relative position between the diesel particulate filter device 41 and the selective catalytic reduction device 42 can vary in a wide range.

Modifications

The exemplary embodiment of the present invention has been explained above. However, the present invention is not limited to the aforementioned exemplary embodiment, and a variety of changes can be made without departing from the scope of the present invention.

In the aforementioned exemplary embodiment, explanation has been made for the example of applying the exhaust treatment unit 24 to the hydraulic excavator. However, the exhaust treatment unit 24 may be applied to another work vehicle such as a bulldozer.

The diesel particulate filter device 41 may be disposed below the beam members 36 and 37. It should be noted that the diesel particulate filter device 41 is preferably disposed above the selective catalytic reduction device 42.

The shape of the diesel particulate filter device 41 and that of the selective catalytic reduction device 42 may not be limited to cylindrical shapes or the like, and may be other shapes such as an elliptic cylindrical shape or a rectangular parallelepiped shape.

The first direction may not be limited to the vehicle width direction, and may be another direction. In other words, the diesel particulate filter device 41 and the selective catalytic reduction device 42 may be disposed in alignment with each other in a direction different from the vehicle width direction. For example, the first direction may be the vehicle back-and-forth direction. In other words, the diesel particulate filter device 41 and the selective catalytic reduction device 42 may be disposed in alignment with each other in the vehicle back-and-forth direction.

The diesel particulate filter device 41 may be supported by any of the column members 31 to 35. The selective catalytic reduction device 42 may be supported by any of the column members 31 to 35. The vehicle body frame 27, supporting the diesel particulate filter device 41 and the selective catalytic reduction device 42, may not be limited to the component supporting the exterior cover 28. For example, a dedicated vehicle body frame configured to support the diesel particulate filter device 41 and the selective catalytic reduction device 42 may be provided.

The number of the first support portions 72a and 72b, that of the second support portions 65a and 65b, that of the first locking components 80a and 80b, and that of the second locking components 81a and 81b may not be respectively limited to two, and may be either one or three or more. In correspondence with the configuration, the number of the fourth attachment portions 67a to 67d may be changed. Similarly, the number and so forth of the second attachment portions 62a to 62e, those of the third attachment portions 63a and 63b and those of the fifth attachment portions 68a to 68d may be arbitrarily changed.

INDUSTRIAL APPLICABILITY

According to the present invention, it is possible to provide an exhaust treatment unit that includes a second connection pipe for reliably connecting a diesel particulate filter and a selective catalytic reduction device even when relative positional displacement and/or relative postural displacement are/is produced between the diesel particulate filter device and the selective catalytic reduction device.

The invention claimed is:

1. An exhaust treatment unit adapted to treat an exhaust gas from an engine of a work vehicle, the exhaust treatment unit comprising:
   a diesel particulate filter device configured to treat the exhaust gas;
   a selective reduction catalyst configured to treat the exhaust gas; and
   a connection pipe connecting the diesel particulate filter device and the selective reduction catalyst,
   the diesel particulate filter device and the selective reduction catalyst being disposed in alignment with each other such that longitudinal directions of the diesel particulate filter device and the selective reduction catalyst extend in a common direction;
   the connection pipe being disposed adjacent to the diesel particulate filter device and the selective reduction catalyst such that a longitudinal direction of the connection pipe extends in the common direction;
   a first end of the connection pipe being connected to the diesel particulate filter device and a second end of the connection pipe being connected to the selective reduction catalyst, the second end being opposite the first end along the longitudinal direction of the connection pipe;
   the connection pipe including a plurality of spherical joints,
   the connection pipe having a first pipe part on the first end thereof and a second pipe part on the second end thereof, the plurality of spherical joints including a first spherical joint mounted between the first pipe part and the diesel particulate filter device,
a second spherical joint mounted between the second pipe part and the selective reduction catalyst, and
a third spherical joint mounted between the first pipe part and the second pipe part.

2. The exhaust treatment unit recited in claim 1, wherein a center axis of the first spherical joint and a center axis of the second spherical joint are arranged perpendicularly relative to a center axis of the third spherical joint.

3. The exhaust treatment unit recited in claim 1, further comprising:
a first support configured to support the diesel particulate filter device; and
a second support configured to support the selective reduction catalyst and the first support component,
the first support and the second support being separate parts.

4. The exhaust treatment unit recited in claim 3, wherein the second support component is a stamped member.

5. The exhaust treatment unit recited in claim 2, further comprising:
a first support configured to support the diesel particulate filter device; and
a second support configured to support the selective reduction catalyst and the first support,
the first support and the second support being separate parts.

* * * * *